(12) United States Patent
Graham

(10) Patent No.: US 12,086,076 B2
(45) Date of Patent: Sep. 10, 2024

(54) COMPUTING DEVICES FOR ENCRYPTION AND DECRYPTION OF DATA

(71) Applicant: HEWLETT-PACKARD DEVELOPMENT COMPANY, L.P., Spring, TX (US)

(72) Inventor: Christoph J. Graham, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/801,375

(22) PCT Filed: Feb. 21, 2020

(86) PCT No.: PCT/US2020/019163
§ 371 (c)(1),
(2) Date: Aug. 22, 2022

(87) PCT Pub. No.: WO2021/167617
PCT Pub. Date: Aug. 26, 2021

(65) Prior Publication Data
US 2023/0100160 A1    Mar. 30, 2023

(51) Int. Cl.
*G06F 12/14* (2006.01)
*G06F 21/71* (2013.01)
*G06F 21/72* (2013.01)
*H04L 9/08* (2006.01)

(52) U.S. Cl.
CPC ........ *G06F 12/1408* (2013.01); *H04L 9/0861* (2013.01); *G06F 2212/1052* (2013.01)

(58) Field of Classification Search
CPC ......... G06F 12/1408; G06F 2212/1052; H04L 9/0861

USPC ........................................................ 713/189
See application file for complete search history.

(56) References Cited

U.S. PATENT DOCUMENTS

| 7,568,055 | B2 | 7/2009 | Nakai et al. |
| 7,707,645 | B2 | 4/2010 | Haruki et al. |
| 7,783,898 | B2 | 8/2010 | Detrick et al. |
| 8,006,068 | B1 | 8/2011 | Steiner |

(Continued)

FOREIGN PATENT DOCUMENTS

| CN | 101026455 A | 8/2007 |
| CN | 101178758 A | 5/2008 |

(Continued)

OTHER PUBLICATIONS

Aur'elien Francillon; A Minimalist Approach to Remote Attestation; IEEE:2013; pp. 1-6.*

(Continued)

*Primary Examiner* — Monjur Rahim
(74) *Attorney, Agent, or Firm* — Quarles & Brady LLP

(57) ABSTRACT

A computing device is disclosed. The computing device includes a central processing unit and a mass storage bus. The central processing unit includes an application processing unit and an immutable encryption key for use with the encryption of data and the decryption of data. The application processing unit includes an instruction set to perform an encryption of data and a decryption of data stored via the mass storage bus. The immutable encryption key stored in the central processing unit and inaccessible from outside of the instruction set.

15 Claims, 3 Drawing Sheets

(56) References Cited

U.S. PATENT DOCUMENTS

| | | | |
|---|---|---|---|
| 8,356,188 | B2 | 1/2013 | Kudelski |
| 8,479,014 | B1 | 7/2013 | Hu |
| 9,015,454 | B2 | 4/2015 | Badaoui-Najjar et al. |
| 9,058,491 | B1* | 6/2015 | Ahlquist ............... G06F 9/4401 |
| 9,454,215 | B2 | 9/2016 | Zafarana |
| 10,097,542 | B2 | 10/2018 | Woodward et al. |
| 2002/0051536 | A1 | 5/2002 | Shirakawa et al. |
| 2006/0015748 | A1 | 1/2006 | Goto et al. |
| 2006/0288426 | A1* | 12/2006 | Saito ................... H04N 21/4408 |
| 2007/0220601 | A1 | 9/2007 | Huelsbergen et al. |
| 2009/0019290 | A1* | 1/2009 | Ye ......................... G06F 21/125 |
| | | | 713/189 |
| 2009/0204803 | A1 | 8/2009 | Cox et al. |
| 2009/0276617 | A1 | 11/2009 | Grell et al. |
| 2009/0292902 | A1 | 11/2009 | Henry et al. |
| 2009/0327746 | A1 | 12/2009 | Greco et al. |
| 2010/0082984 | A1* | 4/2010 | Ellison .................. H04L 9/3236 |
| | | | 713/170 |
| 2010/0088525 | A1* | 4/2010 | Ureche .................. G06F 21/72 |
| | | | 713/193 |
| 2010/0235648 | A1 | 9/2010 | Hoang et al. |
| 2011/0087896 | A1* | 4/2011 | Thom ..................... G06F 21/34 |
| | | | 713/193 |
| 2011/0246785 | A1* | 10/2011 | Linsley ............... G06F 9/45558 |
| | | | 718/1 |
| 2013/0198526 | A1 | 8/2013 | Goto |
| 2015/0106631 | A1 | 4/2015 | Bettendorff |
| 2015/0347724 | A1 | 12/2015 | Torrey |
| 2016/0104010 | A1 | 4/2016 | Henry et al. |
| 2017/0093567 | A1 | 3/2017 | Gopal et al. |
| 2019/0347213 | A1 | 11/2019 | Lutz et al. |
| 2020/0265169 | A1 | 8/2020 | Goto et al. |
| 2020/0382303 | A1 | 12/2020 | Girkar et al. |
| 2021/0312057 | A1* | 10/2021 | Kloth ................... G06F 3/0623 |

FOREIGN PATENT DOCUMENTS

| | | | |
|---|---|---|---|
| CN | 102521535 | A | 6/2012 |
| CN | 202870835 | U | 4/2013 |
| CN | 203966126 | U | 11/2014 |
| CN | 205302294 | U | 6/2016 |
| CN | 107590385 | A | 1/2018 |
| CN | 107924448 | A | 4/2018 |
| CN | 110138556 | A | 8/2019 |
| CN | 110138557 | A | 8/2019 |
| CN | 110472444 | A | 11/2019 |
| CN | 110661767 | A | 1/2020 |
| GB | 2457169 | A | 8/2009 |
| JP | 6419660 | B2 | 11/2018 |
| KR | 10-2014-0148153 | A | 12/2014 |
| TW | I581183 | B | 5/2017 |
| TW | I631462 | B | 8/2018 |
| TW | I633438 | B | 8/2018 |
| WO | WO2022051189 | * | 3/2022 |

OTHER PUBLICATIONS

Anonymous: "Hardware-accelerated disk encryption in Android 5.1 May 8, 2015", May 8, 2015 (May 8, 2015), pp. 1-14, XP093066273, Retrieved from the Internet: URL:https://web.archive.org/web/20190806182614/https://nelenkov.blogspot.com/2015/05/hardware-accelerated-disk-encryption-in.html.

Anonymous: "STMicroelectronics Unveils 90nm System-on-Chip Capability for Hard Disk Drives", Jan. 1, 2006 (Jan. 1, 2006), pp. 1-2, XP093066270, Retrieved from the Internet: URL:https://www.electronicspecifier.com/news/analysis/stmicroelectronics-unveils-90nm-systemonchip-capability-for-hard-disk-drives.

Embedded Staff: "Cryptography in software or hardware: It depends on the need", Aug. 28, 2011 (Aug. 28, 2011), pp. 1-9, XP093066264, Retrieved from the Internet: URL:https://www.analog.com/en/technical-articles/cryptography-in-software-or-hardware--it-depends-on-the-need.html#:~:text=A%20symmetrical%2C%20bulk%20encryption%20need,or%20a%20balance%20of%20all.

* cited by examiner

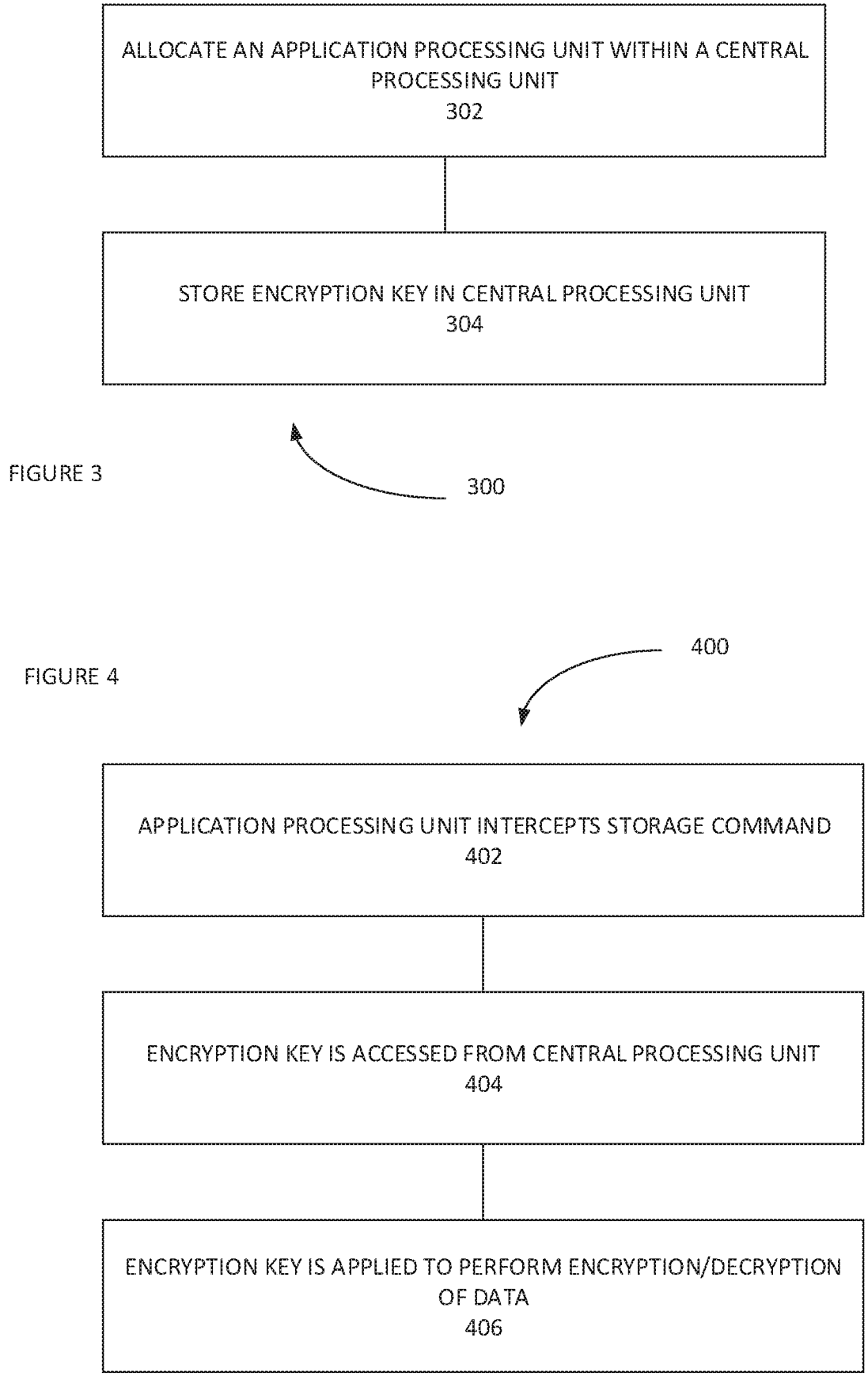

COMPUTING DEVICES FOR ENCRYPTION AND DECRYPTION OF DATA

BACKGROUND

Computing devices are machines that can be instructed to carry out arithmetic or logical operations automatically via computer programming and can follow generalized sets of operations, called programs. The programs enable computing devices to perform an extremely wide range of tasks. A computer system can include hardware, an operating system, and peripheral equipment used for operation. Computing devices can take a wide variety of forms and are used as control systems for a wide variety of industrial and consumer applications. This includes simple special purpose computing devices such as printing devices; industrial robots; general-purpose devices including workstations, servers, personal computers, laptops, and mobile devices such as tablets and smartphones; and consumer devices such as video game consoles. Computing devices can be stand-alone devices or configured as part of a computer network.

Computing devices can be equipped with mass storage devices, equipped to receive mass storage devices, or have access to mass storage devices, which can be able to store data in a persisting and machine-readable form as a removable or non-removable device. Mass storage devices can be devices or systems including tape libraries, RAID systems, and computer drives such as magnetic disk drives, solid-state drives, optical disc drives, memory cards, and memory sticks (such as USB drives), and can include combinations of such devices. For instance, a computing device may have access to a mass storage device having storage tiers including a solid-state drive and hard disk drives.

BRIEF DESCRIPTION OF THE DRAWINGS

FIG. 3 is a block diagram illustrating an example method to construct the computing device of FIG. 2.

FIG. 4 is a block diagram illustrating an example method of the computing device of FIG. 2.

DETAILED DESCRIPTION

Figure 1:
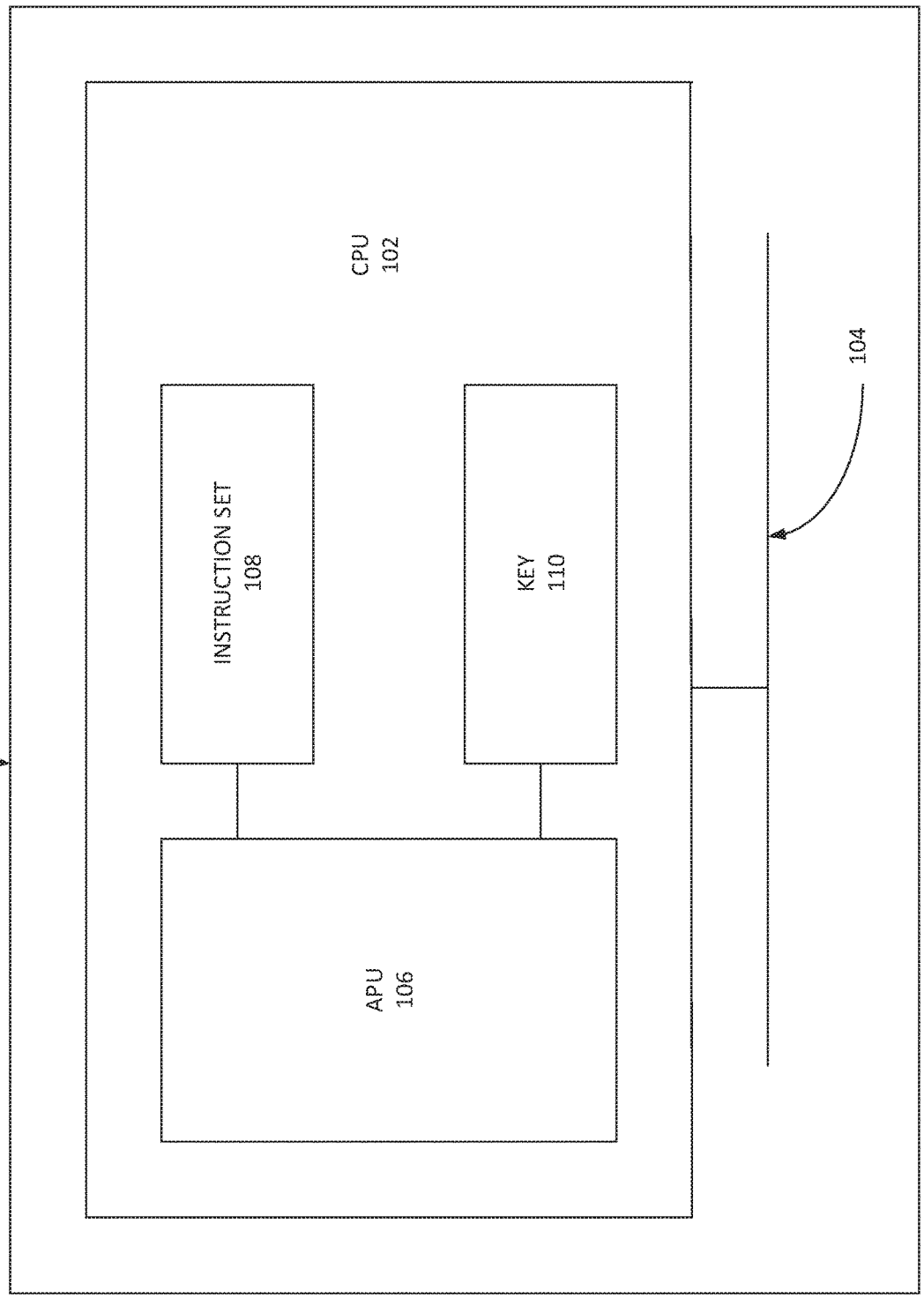
FIG. 1 is a block diagram illustrating an example computing device.

Computing devices can include mass storage devices or provide access to mass storage devices such as via a bus to store machine-readable data. If the data includes sensitive or confidential information, the theft or loss of the computing device can pose an issue. Many portable computing devices, such as laptops and mobile computing devices, are particularly susceptible to theft of loss as they can be used in insecure locations to access or process and store sensitive or confidential data.

To alleviate the consequences of a lost or stolen computing device, some computing device producers provide security solutions such as installing a self-encrypting mass storage device in the computing device. A self-encrypting mass storage device will apply an encryption key to write data to the storage device as encrypted data, and will decrypt the encrypted data with the encryption key to read the data from the storage device. In such an example, the mass storage device protects the confidentiality and security of the data and the encryption key. An issue with this common security solution is that the encrypted data is not bound to the computing device. For instance, the secure drive may be removed and installed into another system, or the encrypted keys can be accessed to steal the data from the secure drive.

Security solutions that have been developed to mitigate the accessibility data on mass storage devices generally fall into the categories of software-based data encryption and hardware-based data encryption. Software-based data encryption involve an environment in which a device driver or software element can interface with a mass storage device and act as an intermediary to write encrypted and read decrypted data via a key. The key is stored in a location that the software can access and apply from boot cycle to boot cycle of the computing device. Hardware-based data encryption combines encryption with the underlying storage solution. Examples can include self-encrypting mass storage devices, such as an SED (self-encrypting drives), an encrypted NVMe (non-volatile memory express) or other solutions that bind the storage firmware and the encryption solution. Hardware-based data encryption can store the key on the device or elsewhere and allow for solutions that can encrypt an entire data area.

In one example, the disclosure is directed to an application processing unit, which may be included as part of a central processing unit in a computing device, that intercepts and processes input/output commands to a mass storage device of the computing device in which the application processing unit supports encryption, such as symmetric encryption of block data. The encryption key for the encryption and decryption is securely generated during manufacture of the central processing unit and securely stored within the central processing unit. In the example, access to the encryption key is from the application programming unit, and not from Input/output transactions that can be serialized into a command stream based on encrypted or decrypted data buffers. In one example of a detection of a response to a read-based storage command, the application processing unit will apply the encryption key to decrypt contents from the mass storage device and pass the decrypted command buffer to the calling application code. In one example of a detection of response to a write-based storage command, the application processing unit will apply the encryption key to encrypt contents from a calling application before sending a write operation to the mass storage device.

Through the use of the application processing unit, the operating system and software of the computing device are unaware and agnostic to the encryption and decryption of the data block, and the use of specialized storage system components is obviated. Further, the use of the application processing unit can reduce costs and provide for faster performance over specialized storage system components. Further, the application processing unit can be used to encrypt and decrypt data for multiple mass storage devices coupled to the computing device. Encrypted data is securely bound to the central processing unit even in circumstances in which the mass storage device is removed from the computing device.

FIG. 1 illustrates an example computing device including a central processing unit 102 and a mass storage bus 104. The central processing unit 102 includes an application processing unit 106 having an instruction set 108 to perform encryption and decryption of block data of input/output operations on the mass storage bus 104. An immutable encryption key 110 for use with the encryption and decryption of block data is stored in the central processing unit 102 and inaccessible from outside of the instruction set 108.

In the example, the central processing unit 102 includes a main processing core that may be configured to run the operating system and perform traditional tasks or general-purpose tasks. In one example, the central processing unit 102 may include a plurality of main processing cores to run the operating system and perform general-purpose tasks usually on the same integrated circuit together. The central processing unit 102 also includes built-in logic or programmable functional unit, also usually on the same integrated circuit, as the application processing unit 106 with a heterogeneous instruction-set architecture 108. In additional to multiple general-purpose, main processing cores and the application processing unit 106, the central processing unit 102 can include functional units to interface with other devices, graphics processing units, and an audio or video decoder/encoder, which may include heterogeneous or homogenous instruction set architectures with the main processing cores.

The instruction set 108 and encryption key 110 can be both immutable and inaccessible outside of the application processing unit 106. In one example, the instruction set 108 is immutable and permanently encoded into integrated circuit and inaccessible outside of the application processing unit 106 such as in a non-volatile memory location of the central processing unit 102. Further, the encryption key 110 can be immutable and permanently encoded into the integrated circuit and inaccessible from outside of the instruction set 108. For example, the encryption key 110 can be stored in a non-volatile memory location within the central processing unit 102, which may be accessible by the instruction set 108. In one example, the encryption key 110 is a symmetric key.

The mass storage bus 104 is operably coupled to the central processing unit 102 and includes a communication system to transfer block data between the central processing unit 102 and a mass storage device, in which the bus 104 can include hardware and communication protocols. In one example, the mass storage bus 104 can include a plurality of protocols, such as USB (universal serial bus) or SATA (serial ATA, or serial AT attachment). In one example, the instruction set 108 is bus agnostic in that the encryption and decryption can be performed for an operably coupled mass storage device.

Figure 2:
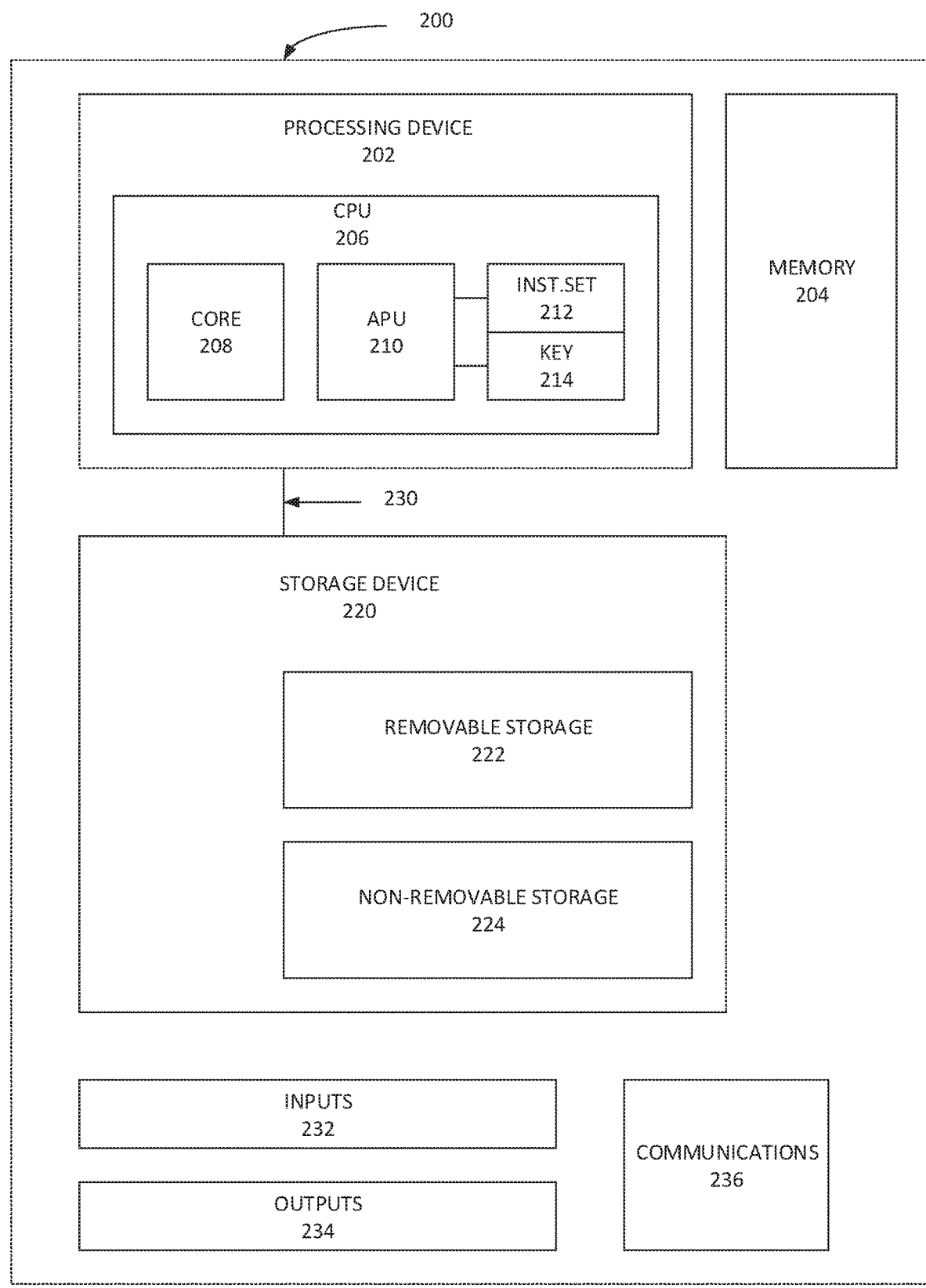
FIG. 2 is a block diagram illustrating another example computing device according to the computing device of FIG. 1.

FIG. 2 illustrates an example computing device 200, which can be in accordance with computing device 100. The computing device 200 can take several forms such as a tablet, a personal computer, a laptop, a workstation, a server, a handheld device, or a consumer electronic device, and can be a stand-alone device or configured as part of a computer network.

In a hardware configuration, computing device 200 typically includes a processor system having a processing unit, i.e., a processing device 202 and memory 204. By way of example, the processing device 202 may include a plurality of processing cores on a chip or a plurality of processor chips. The example processing device 202 includes a central processing unit 206 that can include a main processing core 208 and an application processing unit 210. In one configuration, the central processing unit includes a plurality of main processing cores, the application processing unit, and an additional functional unit. In some examples, the processing device 202 can also include an additional processor or specialized processors, such as a graphics processor for general-purpose computing on an integrated processing circuit or graphics processor units, to perform processing functions offloaded from the central processing unit 206. The memory 204 may be arranged in a hierarchy and may include one or more levels of cache. Depending on the configuration and type of computing device, memory 204 may be volatile (such as random-access memory (RAM)), non-volatile (such as read only memory (ROM), flash memory, etc.), or a combination of the two. In some example, memory 204 may be integrated into the processing device 202 and a portion of memory 204 may be integrated into the central processing unit 206 to store features as an instruction set 212 for the application processing unit 210 and an encryption key 214 for use with the instruction set 212.

Computing device 200 can also have additional features or functionality. For example, computing device 200 may also include a mass storage device 220 to store block data. Such mass storage device 220 may include removable storage 222 and non-removable storage 224. In one example, removable storage 222 can include memory cards, USB drives, and optical discs. In this example, the removable storage can be readily ejected from the computing device 200. In one example, non-removable storage 224 can include solid-state drives, hard-disk drives, and hybrid drives. In this example, the non-removable storage 224 is intended to remain with the computing system 200. In some examples, the computing device 200 can include both removable 222 and non-removable 224 storage and may include a plurality of removable storage 222 or a plurality of non-removable storage 224.

Computer storage media includes volatile and nonvolatile, removable and non-removable media implemented in a suitable method or technology for storage of information such as computer readable instructions, data structures, program modules or other data. Memory 204 and mass storage device 220 are examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, USB flash drive, flash memory card, or other flash storage devices, or other storage medium that can be used to store the desired information and that can be accessed by computing device 200. Accordingly, a propagating signal by itself does not qualify as storage media. Any such computer storage media may be part of computing device 200 and implemented as memory 204 or mass storage device 220.

Computing device 200 includes a mass storage bus 230 to operably couple the processing device 202 to the mass storage device 220. For instance, the mass storage bus 230 is operably coupled to the application processing unit 210 via the central processing unit 206. The mass storage bus 230 is also operably coupled to mass storage device 220 such as the removable storage 222 and non-removable storage 224. The mass storage bus 230 is configured to move block data between the processing device 202 and the mass storage device 230 and between the mass storage device 230 and the processing device 202. In one example, the mass storage bus 230 can include hardware and a communication protocol to move the block data.

Computing device 200 often includes input connections, output connections, or input/output connections such as USB connections, display ports, and proprietary connections to connect to various devices to provide inputs and outputs to the computing device. Input devices may include devices such as keyboard, pointing device (such as a mouse, track pad), stylus, voice input device, and touch input device (such as a touchscreen). Output devices may include devices such as a display, speakers, and printing devices. An example computing device may include input devices 232 such as a keyboard, track pad, and microphone and output devices 234 such as a display and speakers. In one example, the mass storage bus 230 may use the input/output connections to access a mass storage device.

Computing device 200 often includes one or more communication connections 236 that allow computing device 200 to communicate with other computers or applications. Example communication connections can include an Ethernet interface, a wireless interface, a bus interface, a storage area network interface, and a proprietary interface. The communication connections can be used to couple the computing device 200 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, and the internet. In one example, the mass storage bus 230 may use the network to access a mass storage device, such as a network drive or cloud drive.

FIG. 3 illustrates a method 300, which can be used, for example, in producing a computing device 200, or central processing unit 206 of processing device 202. An application processing unit 210 is allocated within a central processing unit 206 at 302. In the example of computing device 200, the application processing unit 210 can be allocated within the central processing unit 206 from a programmable functional unit on the central processing unit 206 separate from a main processing core 208. The application processing unit 210 is configured to perform encryption of data and decryption of data from a mass storage device, such as mass storage device 220, operably coupled to the central processing unit 206, such as mass storage device operably coupled to the central processing unit via mass storage bus 230. An immutable encryption key 214 for use with the encryption and decryption of the data with the application processing unit 210 is stored in the central processing unit 206 at 304. The immutable encryption key is inaccessible from outside of the application processing unit 210. In the example, the application processing unit 210 can be configured to run an instruction set 212 to apply the encryption key 214. In one example, the instruction set 212 can be included in a computer or processor readable medium, such as a non-transitory computer readable medium, to store computer readable instructions to control the application processing unit allocated in the central processing unit. In one example, the instruction set 212 is immutable and inaccessible from outside of the central processing unit 206, and configured during the allocation of the application processing unit at 302. The encryption key can be persistently stored in the central processing unit 206, such as in a read-only memory and remains the same for each boot cycle, and accessible by the instruction set 212.

FIG. 4 illustrates an example method 400 that can be performed by the instruction set 212. In one example, the method 400 can be implemented in a non-transitory computer or processor readable medium, such as a memory device, to store computer or processor executable instructions to control a function programming unit, such as an application processing unit 210 in a central processing unit 206 or as an application processing unit 210 in a processing device 202. In one example, the application processing unit intercepts a storage command at 402. For example, the storage command can include an input/output command to the mass storage device 220 such as a read command or a write command. An immutable encryption key, such as key 214, stored in the processor, such as the central processing unit 206 or the processing device 202, is accessed at 404. The encryption key 214 is inaccessible from outside of the application processing unit. An encryption of data and a decryption of data stored on a mass storage device is performed using the encryption key at 406.

In one example, the method 400 can be implemented for a write command, such as in the case of a calling application that is executing on the processing device 202 writing a block data to the mass storage device 220. The application via the processing device 202 creates a data payload, or buffer, to be written to the mass storage device 220. The application passes the buffer to an operating system storage driver corresponding with the mass storage device. The operating system storage driver generates a request in a format of the mass storage bus. For example, if the mass storage bus is a SATA bus, the operating system storage driver crafts the request in the SATA format. The generated request includes a translation from the semantics of the file system to a physical address of the mass storage device. For example, a file name such as C:\README.TXT is translated to a physical address (e.g., 0x1111) that maps to a location on the mass storage device. The operating system storage driver sends a storage request to the mass storage bus. The application processing unit intercepts the storage request, such as at 402, via the instruction set recognizing the storage command. The instruction set accesses the encryption key at 404 and modifies the buffer to encrypt the contents at 406. In the example, the buffer remains the same size after the encryption as before the encryption. The instruction set passes the storage command to the mass storage device, and the mass storage device writes the contents of the buffer to a memory device within the mass storage device.

In one example, the method 400 can be implemented for a read command, such as in the case of a calling application that is executing on the processing device 202 reading a block data from the mass storage device 220. The calling application via the processing device requests an address and size of the data to be read. The calling application also allocates an empty buffer to the operating system storage driver. The operating system storage driver generates a request in a format of the mass storage bus. For example, if the mass storage bus is a SATA bus, the operating system storage driver crafts the request in the SATA format. The generated request includes a translation from the semantics of the file system to a physical address of the mass storage device. For example, a file name such as C:\README.TXT is translated to a physical address (e.g., 0x1111) that maps to a location on the mass storage device. The operating system storage driver sends a storage request to the mass storage bus. The application processing unit intercepts the storage request, such as at 402, via the instruction set recognizing the storage command, and passes the read command on to the mass storage device. The mass storage device writes the encrypted contents of the buffer. The application processing unit access the encryption key at 404, modifies the buffer retrieved from the storage device to decrypt the retrieved contents via the encryption key at 406. In the example, the buffer remains the same size. The application processing unit via the instruction set passes the buffer with the decrypted contents to the operating system driver. The operating system driver passes the buffer with the decrypted contents to the application, and the application can apply the read data via the processing device 202, such as a main processing core.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A central processing unit for a computing device, the computing device including a mass storage bus, the central processing unit comprising:
    an application processing unit having an instruction set to perform an encryption of data and a decryption of data stored via the mass storage bus, wherein the instruction set is stored in the central processing unit and inaccessible from outside of the application processing unit; and
    an immutable encryption key for use with the encryption of data and the decryption of data, the immutable encryption key stored in the central processing unit and inaccessible from outside of the instruction set.

2. The central processing unit of claim 1 wherein the central processing unit is configured in the computing device, the central processing unit operably coupled to the mass storage bus, and the mass storage bus operably coupled to a mass storage device.

3. The central processing unit of claim 2 wherein the mass storage device is one of a removable storage and a non-removable storage.

4. The central processing unit of claim 1 including a main processing core on an integrated circuit with the application processing unit, wherein the application processing unit is separate from the main processing core.

5. The central processing unit of claim 1 wherein the immutable encryption key is a symmetric key.

6. The central processing unit of claim 1 wherein the instruction set is immutable.

7. The central processing unit of claim 1 wherein the instruction set is stored in a non-volatile memory location in the central processing unit.

8. The central processing unit of claim 1 wherein the immutable encryption key is stored in a non-volatile memory location.

9. A method, comprising:
    allocating an application processing unit within a central processing unit of a computing device to perform an encryption of data to and a decryption of data from a mass storage unit operably coupled to the central processing unit;
    storing an instruction set within the central processing unit, the instruction set for use with the application processing unit to perform the encryption of data to and a decryption of data from a mass storage unit; and
    storing an immutable encryption key in the central processing unit for use with the application processing unit, the immutable encryption key inaccessible from outside of the application processing unit.

10. The method of claim 9 wherein the storing the immutable encryption key includes storing the immutable encryption key in a non-volatile memory location in the central processing unit.

11. The method of claim 9, wherein storing the instruction set includes storing the instruction set is stored in a non-volatile memory location in the central processing unit.

12. A non-transitory computer readable medium to store computer executable instructions to control an application processing unit allocated in a processor to:
    access an immutable encryption key stored in the processor, the encryption key inaccessible from outside of the application processing unit;
    access a set of instructions stored in the processor, the set of instructions inaccessible from outside of the application processing unit; and
    perform, with the set of instructions, an encryption of data and a decryption of data stored via a mass storage bus using the immutable encryption key.

13. The non-transitory computer readable medium of claim 12, wherein the executable instructions further control the application processing unit to intercept comprising intercepting a storage command.

14. The non-transitory computer readable medium of claim 12 wherein the non-transitory computer readable medium is located within the processor.

15. The method of claim 9, wherein storing the instruction set includes storing an instruction set that is inaccessible from outside of the central processing unit.

* * * * *